United States Patent [19]

Carland

[11] Patent Number: 5,308,451
[45] Date of Patent: May 3, 1994

[54] FRACTIONATION TRAY FOR CATALYTIC DISTILLATION

[75] Inventor: Robert J. Carland, Williamsville, N.Y.

[73] Assignee: UOP, Des Plaines, Ill.

[21] Appl. No.: 970,454

[22] Filed: Nov. 2, 1992

[51] Int. Cl.⁵ .............................................. B01D 3/32
[52] U.S. Cl. .................................... 202/158; 203/29; 203/DIG. 6; 261/114.4; 422/190
[58] Field of Search ........... 202/158; 203/29, DIG. 6; 261/114.1, 114.4; 422/190; 159/43.1; 502/527

[56] References Cited

U.S. PATENT DOCUMENTS

| | | | |
|---|---|---|---|
| 2,676,875 | 4/1954 | Barr | 422/191 |
| 3,410,540 | 11/1968 | Bruckert | 261/113 |
| 3,541,000 | 11/1970 | Hanson et al. | 422/191 |
| 3,579,309 | 5/1971 | Sennewald et al. | 23/288 |
| 3,634,535 | 1/1972 | Haunschild | 260/677 A |
| 3,882,167 | 5/1975 | Lohmar et al. | 203/DIG. 6 |
| 3,957,443 | 5/1976 | Strickland et al. | 208/164 |
| 4,126,539 | 11/1978 | Derr, Jr. | 208/108 |
| 4,167,475 | 9/1979 | Winter et al. | 208/355 |
| 4,221,653 | 9/1980 | Chervenak et al. | 208/413 |
| 4,247,368 | 1/1981 | Bannon et al. | 202/158 |
| 4,439,350 | 3/1984 | Jones, Jr. | 203/DIG. 6 |
| 4,471,154 | 9/1984 | Franklin | 203/DIG. 6 |
| 4,579,647 | 4/1986 | Smith | 208/111 |
| 4,618,051 | 10/1986 | Skraba | 202/153 |
| 4,620,952 | 11/1986 | Hsieh | 261/114.1 |
| 4,937,051 | 6/1990 | Graven et al. | 261/98 |
| 4,950,803 | 8/1990 | Smith, Jr. | 568/697 |
| 5,026,459 | 6/1991 | Quang et al. | 202/158 |
| 5,073,236 | 12/1991 | Gelbein et al. | 203/29 |
| 5,098,615 | 3/1992 | Resetarits | 202/158 |
| 5,102,583 | 4/1992 | Bannon | 261/114.1 |
| 5,108,550 | 4/1992 | Pinaire et al. | 203/DIG. 6 |
| 5,130,102 | 7/1992 | Jones, Jr. | 261/114.1 |
| 5,209,875 | 5/1993 | Miller et al. | 261/114.1 |

Primary Examiner—Virginia Manoharan
Attorney, Agent, or Firm—Thomas K. McBride; John F. Spears, Jr.

[57] ABSTRACT

A device for use in a fractional distillation column or a column used to perform catalytic distillation. One or more of the downcomers of a multiple downcomer type fractionation tray is employed as a liquid collection device to remove liquid from the column. Optionally this downcomer may contain an enclosed bed of catalyst, which may be replaced while the column is being used by catalyst addition and withdrawal lines extending outside of the column.

10 Claims, 4 Drawing Sheets

FRACTIONATION TRAY FOR CATALYTIC DISTILLATION

FIELD OF THE INVENTION

The invention relates to the design and construction of vapor-liquid contacting apparatus. The invention therefore relates to, for example, apparatus used as fractionation trays within fractional distillation columns to perform separations of volatile chemical compounds. The invention specifically relates to a fractionation tray useful in performing catalytic distillation and in the withdrawal or addition of liquid from a fractional distillation column.

PRIOR ART

Fractional distillation trays are widely employed in the hydrocarbon processing, chemical, and petrochemical industries. Accordingly, a large amount of research, development, and creative thinking has been devoted to providing improved fractional distillation trays. Fractionation tray development has therefore provided many variations in contacting area structure, downcomer design, and overall tray structure.

In ordinary fractional distillation, it is often desired to remove a liquid sidecut from the column. Devices have been developed to perform this task. U.S. Pat. No. 4,247,368 issued to R. P. Banon et al. is believed to be pertinent for showing one such device for removing a liquid sidecut. As shown in the Drawing of this citation, a significant vertical height within the column is occupied by this device.

U.S. Pat. No. 3,410,540 issued to W. Bruckert is believed pertinent for its showing of the structure of a prior art multiple downcomer type tray employing the highly distinctive downcomer design similar to that employed in the subject tray.

U.S. Pat. No. 3,579,309 issued to K. Sennewald et al. is believed pertinent for its showing of a catalytic distillation column in which streams of liquid reactants are withdrawn at various elevations and passed through external reaction vessels.

U.S. Pat. No. 3,634,535 to W. Haunschild is pertinent for its showing that ethers including methyl tertiary butyl ether (MTBE) can be produced by catalytic distillation in which there is concurrent reaction and distillation. This reference teaches the catalyst may be located on fractionation trays or in downcomers. Etherification by catalytic distillation is also described in U.S. Pat. No. 4,950,803 issued to L. A. Smith et al.

BRIEF SUMMARY OF THE INVENTION

The invention is a fractionation tray system and reactor apparatus useful in performing catalytic distillation. The invention comprises a multiple downcomer type fractionation tray having one or more of the rectangular trough-shaped downcomers blanked off to form a liquid collection downcomer used to withdraw liquids. The liquid collection downcomers may contain confined beds of solid catalyst or other particulate material which aids in vapor disengagement or promotes a desired liquid phase reaction. These solid particulates may be added or withdrawn from the apparatus while it is in use through conduits extending through the wall of the outer vessel.

One broad embodiment of the invention may be characterized as an apparatus for use in a vapor-liquid contacting process comprising a cylindrical outer vessel enclosed by a cylindrical sidewall and having an enclosed upper first end and an enclosed lower second end; vapor liquid contacting means arrayed between the first and second ends of the vessel; and, at least one fractionation tray located intermediate said first and second ends and comprising a plurality of planar perforated vapor liquid contacting decks, a plurality of elongated trough shaped downcomers located between said contacting decks, with the downcomers having substantially imperforate end walls and side walls which adjoin a lower seal plate having liquid sealable outlet means; at least one elongated trough-shaped liquid collection device located between two of said contacting decks and comprising substantially imperforate end walls, sidewalls and lower seal plate; and, a liquid outlet conduit extending through the sidewall of the vessel from the interior of said liquid collection device to a point located outside the vessel.

DETAILED DESCRIPTION AND PREFERRED EMBODIMENTS

Figure 1:
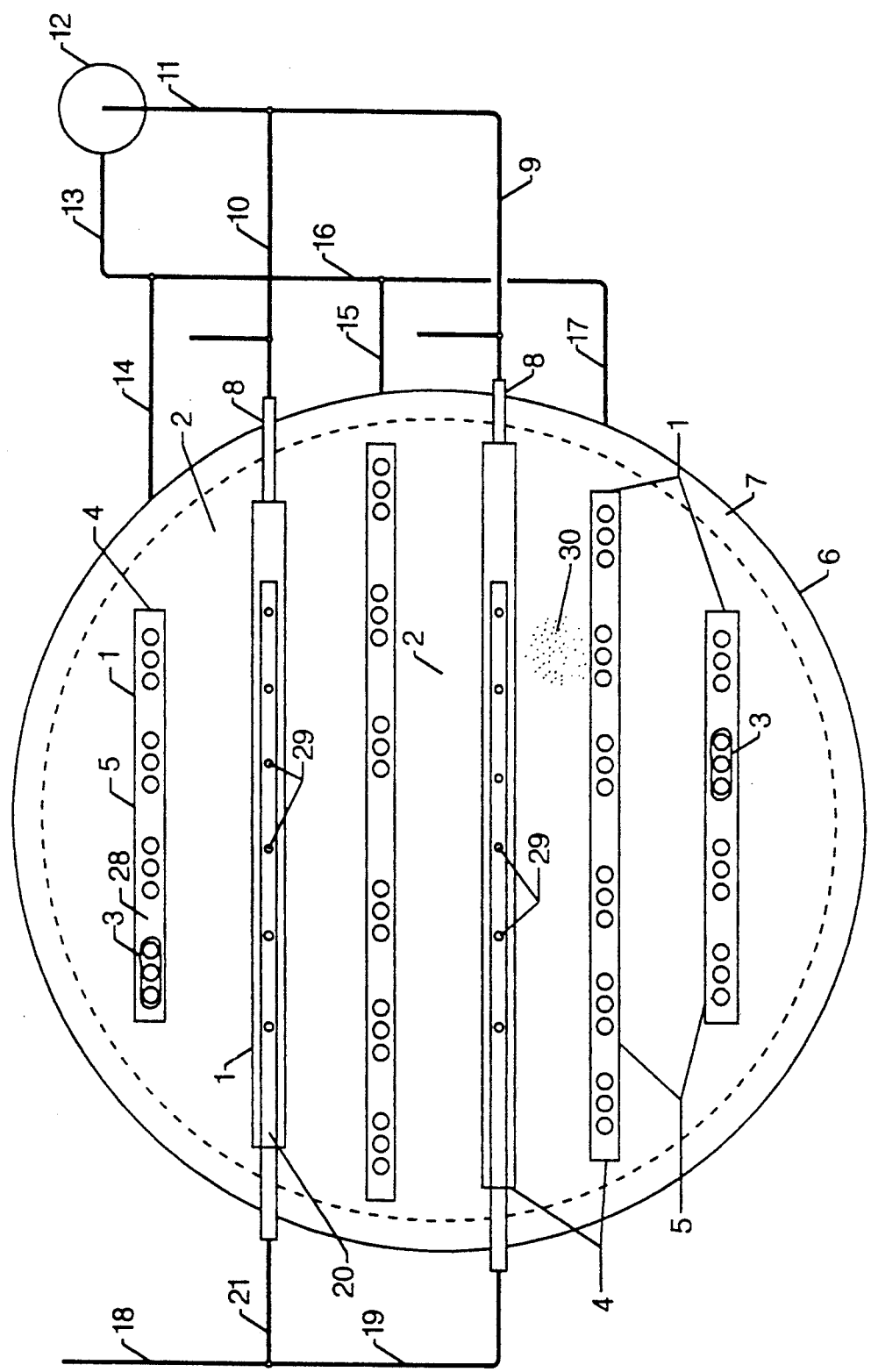
FIG. 1 is a sectional view looking downward into a catalytic distillation column 6 employing the subject invention.

The continuous quest for more economical processes for the production of petrochemicals is driving the development of etherification and alkylation processes employing "catalytic distillation". In these processes, the conversion catalyst is retained within a structure or container capable of promoting vapor-liquid contact and fractional distillation. The overall apparatus normally resembles a fractionation column. This apparatus is provided with means to effect reflux and reboiling of the apparatus.

When catalytic distillation involves an exothermic reaction such as alkylation the heat released by the reaction is allowed to vaporize a portion of the reactants. This causes the more volatile reactants to pass upward through the overall apparatus while the less volatile product hydrocarbons flow downward in a liquid phase. The result is a facile method for separating the product from the reactants. This fractionation within the reaction zone aids in product recovery but more importantly also tends to drive the alkylation reaction to completion by removing the product and supplying fresh reactants. A very high degree of conversion can therefore be achieved by employing catalytic distillation in suitable processes including etherification.

Other advantages attributed to this concept, wherein reaction products are continuously separated from the reactants and removed from the reaction zone by fractional distillation performed concurrently with the reaction, include a decrease in the capital cost of the plant needed to perform the process, the ability to achieve a higher degree of conversion, and the ability to perform processes which formerly were performed only in a batch type operation on a continuous basis. These advantages result from performing the reaction in a separation zone capable of removing the reaction products from the reactants and catalyst. Hence it is only necessary to provide one primary vessel and the reaction is not limited by chemical equilibrium.

It was suggested in the past to apply catalytic distillation to a wide variety of processes such as butene isomerization (U.S. Pat. No. 2,403,672 to M. P. Matuzak) and the hydrolysis of low molecular weight olefin oxides to produce mono-alkylene glycols (U.S. Pat. No. 2,839,588 to A. S. Parker). These early disclosures did not lead to commercialization. Catalytic distillation is only now emerging as a commercially viable hydrocarbon and petrochemical processing tool.

It is an objective of the subject invention to provide an improved apparatus for the withdrawal of liquid from a fractional distillation column. It is also an objective of the invention to provide improved apparatus for the passage of liquid into a fractional distillation column. It is a specific objective of the invention to provide a flexible apparatus for performing catalytic distillation.

These objectives are achieved by modifications and/or additions to a multiple downcomer fractionation tray. Therefore, before proceeding further with a description of the invention, it is useful to define and characterize the type of tray referred to herein as a "multiple downcomer" tray. This term is used herein to distinguish the subject invention from other types of fractionation trays.

A multiple downcomer tray is distinguished from the conventional crossflow tray by several structural characteristics. First, a multiple downcomer tray does not have a "receiving pan" such as employed on most conventional trays. This is the normally imperforate section located below an inlet downcomer opening. Reference is made to previously cited U.S. Pat. No. 4,582,569 to A. E. O. Jenkins which illustrates a receiving pan 8 in FIG. 1. A receiving pan is the imperforate area upon which the liquid descending through the downcomer impacts before passing onto the decking of the tray. Often the receiving pan is separated from the decking or "active" area of the tray by an inlet weir. Receiving pans are therefore normally located directly below the downcomer leading from the next above conventional fractionation tray.

The horizontal surface area of a multiple downcomer fractionation tray is basically divided into downcomer means and vapor-liquid contacting area normally referred to as decking. There are no imperforate areas allocated to receiving descending liquid from the tray located immediately above.

Another distinguishing feature of multiple downcomer fractionation trays is the provision of a relatively large number of trough-like downcomer means across the tray. The subject trays can employ from one to seven or more downcomers. These downcomer means are spaced relatively close together compared to the customary crossflow fractionation trays as they are spread across the surface of the tray rather than being at the periphery of the tray. The distance between adjacent downcomers (measured between their sidewalls or weirs) of the same tray is normally between 0.3 and 1.0 meters and will often be less than 0.5 meter. This results in a multiple downcomer tray having a unique design when viewed from above consisting of the alternating decking areas and downcomer means evenly spaced across the upper surface of the fractionation tray, as for instance shown in FIG. 1.

The actual downcomer means of a multiple downcomer tray are also unique compared to the downcomers employed upon normal cross-flow fractionation trays. The downcomer means do not extend downward to the next fractionation tray. Rather they stop at an intermediate distance located between the two trays. The downcomer descending from the tray above therefore stops well above the deck surface and the inlet to the downcomers of the tray below. The top or inlet to the downcomer of a multiple downcomer tray functions as the outlet weir of the tray, and the bottom of the downcomer of a multiple downcomer tray above is therefore well above the outlet weir of the tray located below.

When installed in a fractionation column, the downcomers on each multiple downcomer trays are preferably oriented at 90 degrees from the tray located immediately above and below.

Yet another distinguishing feature of multiple downcomer fractionation trays is the provision of a liquid sealable means in the bottom or outlet of the downcomer means. The bottom of the downcomer means is therefore partially closed off by a plate having various perforations or by some other means intended to retard the direct downward flow of liquid out of the downcomer means. This liquid sealable outlet is located well above the deck of the tray located immediately below and is at a level above the inlet of the downcomers associated with this next lower tray. The descending liquid is collected in the lower portion of the downcomer means and spills forth upon the next lower tray through these openings.

There is no inlet weir at the bottom of the downcomer of multiple downcomer trays as in a cross-flow tray. The liquid sealable outlet performs this function and, again, the bottom of the downcomer is well above the next tray.

Multiple downcomer trays are characterized by a very short liquid flow path between the point at which the liquid first falls on the tray and the point at which the liquid exits the tray via the downcomer means. This is due primarily to the close spacing of the downcomers as described above. This short distance the liquid must travel coupled with the agitation attendant with the passage of vapor upward through the decking results in multiple downcomer trays having essentially no liquid level gradient from the liquid inlet to exit points.

With the distance between downcomer side walls of adjacent downcomers (the width of a decking section) being between 1 and 0.3 meters, the average liquid flow path is less than one meter.

The physical size of any portion of a multiple downcomer tray must be chosen by a skilled designer considering all aspects of the intended operation of the tray. The following are measurement ranges of commercially employed conventional multiple downcomer type trays which are presented for the purpose of providing guidance in the design and use of the subject apparatus. The spacing between vertically adjacent trays will normally be between 20 and 91 centimeters (8-36 inches) and is preferably between 25-61 centimeters (10-24 inches). The total open area of the deck area is generally in the range of about 5 to about 15 percent. This includes the open area provided by both circular openings and any elongated slots present in the decking area of the tray. The normal hole diameter of the circular perforations may range from about 0.3 to about 2.6 centimeters (⅛–1.0 inches). A hole size of about 0.47 to about 0.64 centimeters (3/16–¼ inch) is normally preferred. The open area provided by slots is preferably from about 0.25 to about 5 percent of the area of the deck. A representative thickness of the decking is about 0.19 centimeters (0.075 inches) to 0.34 cm.

The rectangular inlet openings of the downcomers of a multiple downcomer tray are normally about 6 to about 25 cm wide (2.5–10 inches). The height of a downcomer as measured from the horizontal top edge of the sidewall to the bottom edge of the sidewall is normally between about 15.2 to about 45.7 centimeters (6–18 inches). This includes the height that the downcomer extends above the decking and below the decking. Further information on the arrangement and variations of the elements of a multiple downcomer tray may be obtained by reference to U.S. Pat. No. 3,410,540 which is incorporated herein by reference.

In a preferred embodiment of the subject invention one or more of the downcomers on a tray is provided with a liquid withdrawal line through which liquid entering the downcomer is passed to a point outside of the enclosing vessel, which may be a rather conventional fractionation column or a more elaborate catalytic distillation column. This withdrawal line or outlet may be a simple cylindrical pipe or conduit attached to one of the downcomer sidewalls, preferably near the bottom of the downcomer. There are, however, numerous variations possible in the design of this line and the mechanical attachment of the line to the downcomer. It could be attached to the bottom seal plate or to the sidewall(s) of the downcomer. Two or more drainlines could be provided for each downcomer or a single drainline could be connected to the downcomer at a number of points along the bottom plate or along the sidewall. Each of these connections to the interior of the downcomer can be provided with a screen or grid to prevent the passage of particles, if particles are present in the downcomer, or a lengthy screen can be fitted to the bottom plate to allow liquid to be drawn off from a greater length of the downcomer. It is highly desired to minimize the cost and complexity of this liquid draining and removal system by utilizing the minimum number of conduits and openings in the vessel wall. It is also desirable to minimize the presence of any elements in the column which would restrict the free flow of vapor and liquid. The utilization of a single conduit connected to the downcomer at only one point is therefore preferred.

The bottom surface of the liquid collection downcomer(s) is preferably formed by a single unitary imperforate plate welded to the bottom edges of the side and end walls. This plate may be planar or shaped in some manner to provide a positive flow toward a drainage opening. As clear liquid should be present in the bottom of a well-designed downcomer, the bottom or seal plate of the liquid collection downcomers can be perforated if desired to allow some of the collected liquid to flow downward as in a normal downcomer, but these openings should be fewer in total open area than provided in a similarly designed downcomer.

Figure 2:
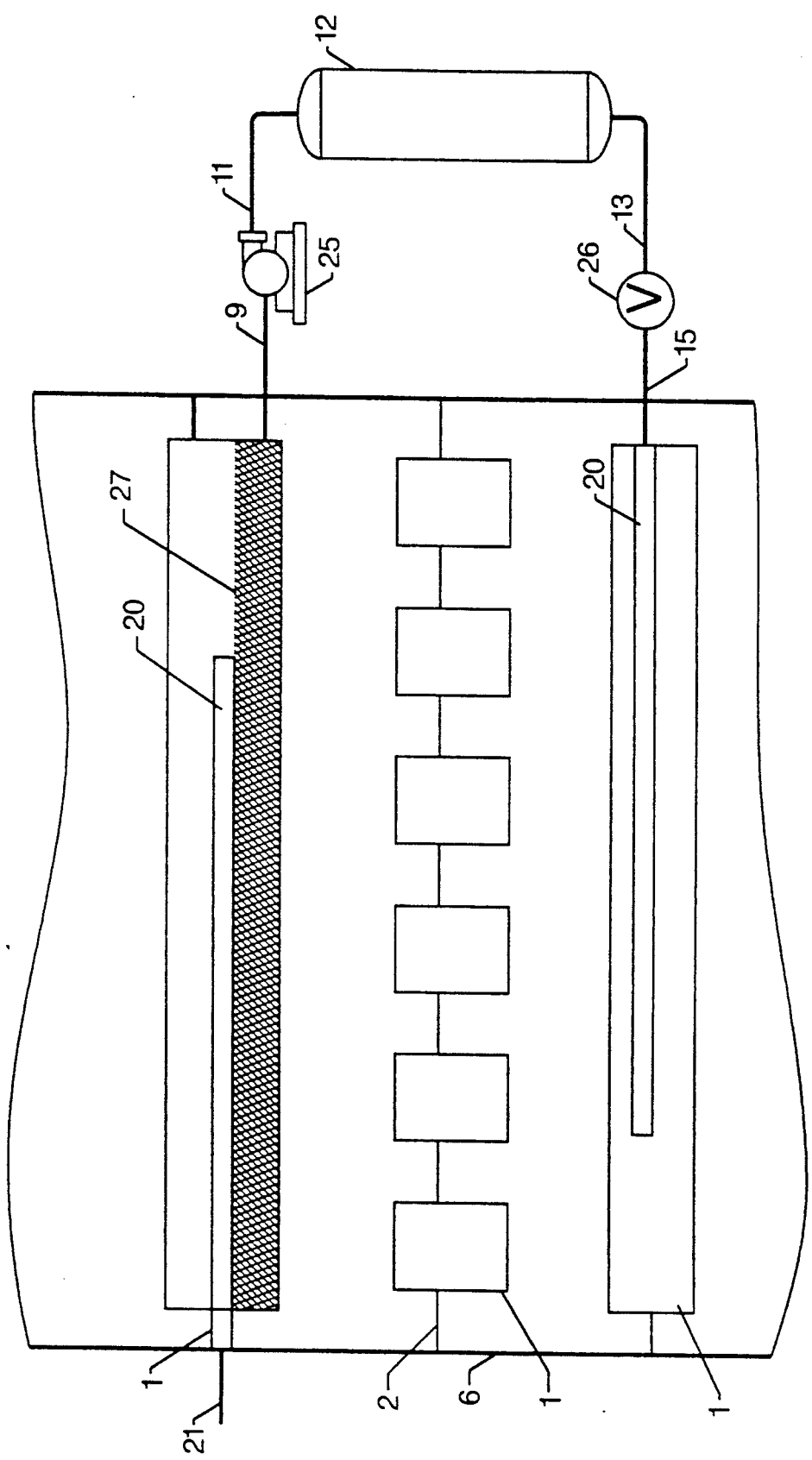
FIG. 2 is a sectional view looking horizontally into a fractional distillation column employing three multiple downcomer trays with the subject invention being employed on the top and bottom trays.
Figure 3:
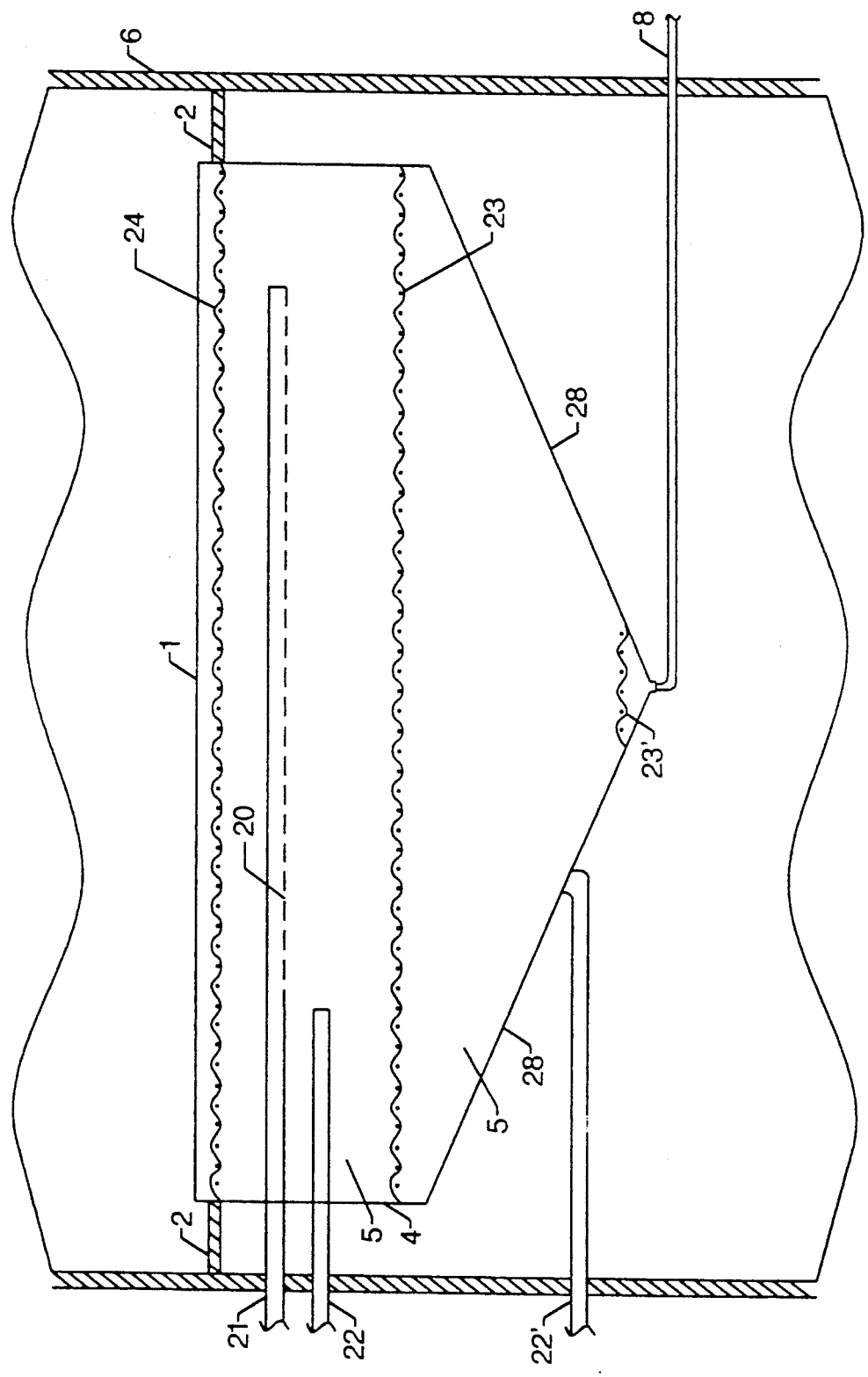
FIG. 3 is an enlarged cross sectional view of a single tray and downcomer 1 illustrating mechanical variations including a catalyst retaining screen 24 and catalyst withdrawal line 22.
Figure 4:
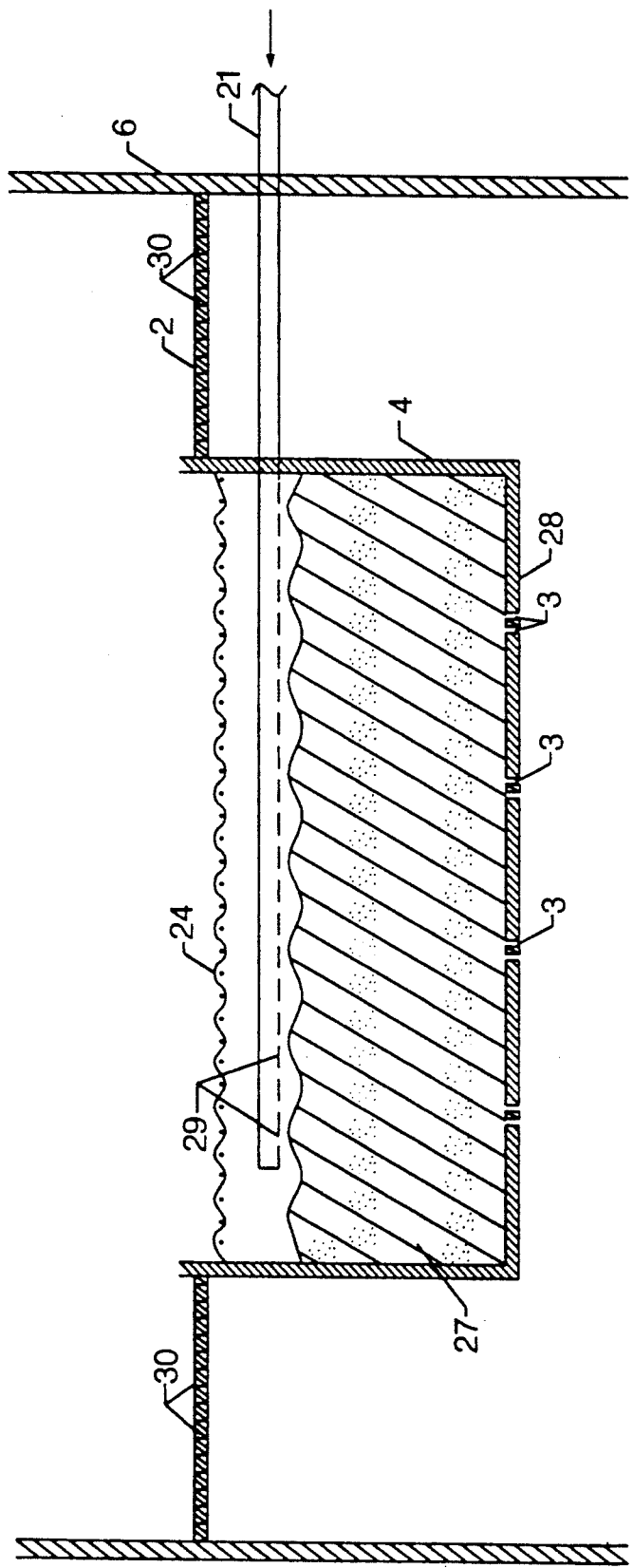
FIG. 4 presents a sectional side view of an embodiment of the invention used to promote catalytic distillation without the withdrawal of liquid from the column.

The subject apparatus may be used to remove liquid for passage into an external reactor as shown on FIGS. 1 and 2, the removal of reaction products as shown in FIG. 3, the addition of a reactant in catalytic distillation as shown in FIG. 4 or for other purposes such as the removal of a desired sidecut.

The subject apparatus has the advantage of not requiring additional vertical space in a column above that required for a normal multiple downcomer-type tray. The subject apparatus also has the advantage of great flexibility in liquid removal rates. By varying the number and size of the downcomers on a tray which are employed for liquid collection, it is possible to greatly vary the percentage of liquid which is collectible for withdrawal from the column. Meanwhile the remaining downcomer(s) function normally leading to greater separation capacity and less disruption of the column's operation than with a conventional trapout tray.

The subject apparatus can be used for catalytic distillation using any suitable catalyst. For etherification, alkylation and isomerization this is any heterogeneous catalyst which gives satisfactory performance in terms of conversion and selectivity for the desired reaction at the conditions required to allow fractional distillation of the reactants and products. The best catalysts to employ in the subject process will of course to a great extent depend upon the identity of the specific reactants to be converted in the process.

The preferred etherification catalyst is a macroporous acid form sulfonic ion exchange resin such as a sulfonated styrene-divinylbenzene resin as described in U.S. Pat. No. 2,922,822 having a degree of crosslinking of from about 5 to 60%. Suitable resins are available commercially. Specialized resins have been described in the art including copolymers of sulfonyl fluorovinyl ether and fluorocarbons as described in U.S. Pat. Nos. 3,784,399 and 3,849,243 Another specially prepared resin consists of the $SiO_2$-modified cation exchangers described in U.S. Pat. No. 4,751,343. The macroporous structure of a suitable resin is described in detail in U.S. Pat. No. 5,012,031 as having a surface area of at least 400 $m^2/g$, a pore volume of 0.6–2.5 ml/g and a mean pore diameter of 40–1000 angstroms. It is contemplated that the subject process could be performed using a metal-containing resin which contains one or more metals from sub-groups VI, VII or VIII of the Periodic Table such as chromium, tungsten, palladium, nickel, chromium, platinum, or iron as described in U.S. Pat. No. 4,330,679. The preferred alkylation catalyst comprises a beta zeolite as described for instance in U.S. Pat. Nos. 4,891,458 and 5,081,323 and EP patent 432814.

Various etherification process techniques, reaction conditions and product recovery methods are described in U.S. Pat. Nos. 4,219,678 to Obenous et al. and 4,282,389 to Droste et al. which are incorporated herein for this teaching. In general any catalytic process performed using the subject apparatus must be performed at conditions which maintain both liquid and vapor phases in the apparatus. These conditions include a general range of pressures from about 5 to about 1450 kPa and a temperature of from about 20° to about 210° C. The presence of hydrogen is generally not desired.

The operation and construction of several embodiments of the subject invention are illustrated in the Figures. Referring now to FIG. 1, the view is seen looking downward onto a fractionation tray having as its two primary structural elements the six trough-like downcomer structures 1 which are surrounded by the flat perforated deck material 2. Vapor passes upward through the perforations 30 which are present across substantially all of the deck material but are represented at only one point on the tray. Four of the trough-like downcomer structures have perforations 3 located at the bottom of seal plate 28 attached to the bottom of the structure. Two of the trough-like liquid collection device structures have imperforate bottom portions. The four trough-like structures 1 having perforations function as ordinary downcomers. This tray therefore has four fully functional conventional downcomer structures which are devoted to collection of liquid from this particular tray. Each of the trough-like structures is comprised of a pair of endwalls 4 and a second pair of parallel sidewalls 5. These walls serve the dual purpose of confining liquid flow and providing structural support for the tray and the weight of the liquid on it. The entire tray is supported on a support ring 7 welded to the inner surface of the outer vessel 6. In operation the tray is horizontal and the outer vessel 6 is vertical.

Each of the trough-like structures function in a normal manner to the extent that they collect liquid from the upper surface of the tray. The four trough-like structures which function as downcomers facilitate the disengagement of vapor from the liquid which enters the downcomer and allow the remaining liquid to flow onto the next lower tray through the perforations in the seal plate. The other two trough-like structures serve only to disengage vapor and collect liquid for removal through downcomer liquid drainlines 8 for passage to a reactor system or another location in the column or for removal from the process. The liquid removed from the two closed trough-like structures is collected in lines 9 and 10 and passed through line 11 into a reaction vessel 12. Preferably the reactants transferred through these lines flow downward through the reaction vessel and emerge via 13. The liquid is then returned to the outer vessel 6 at a lower point not shown in the Drawing through the distribution lines 13, 14, 15, 16 and 17.

FIG. 2 illustrates the cross-sectional view seen looking horizontally through a portion of the column shown in FIG. 1. Three trays are shown in this view. The middle tray is a conventional multiple downcomer tray, with at least one downcomer of each of the top and bottom trays in this view being constructed according to the inventive concept. A portion of the liquid flowing downward through the column is collected in the liquid collection downcomer of the top tray and transferred through lines 9 and 11 to the reaction vessel 12. This stream is preferably pressurized in the pump 25 to overcome the resistance to liquid flow caused by the catalyst bed within vessel 12. This fluid flow resistance otherwise is sufficient to reduce the liquid flow induced by gravity to an unacceptable rate. The pump is also useful in admixing the liquid flowing through line 9.

The effluent of the reaction vessel emerges in line 13 at a rate controlled by a liquid flow control means such as valve 26 and is then passed into the fractionation column through line 15. Preferably a distribution means such as the cylindrical perforated feed distributor 20 is employed to distribute the incoming liquid over the length of the downcomer 1. This view also illustrates the preferred perpendicular alignment of the downcomers of vertically adjacent trays. The downcomers of the central tray in the illustration are therefore aligned at right angles from the downcomers in the top and bottom trays. Another feature shown in this view is that a bed 27 of catalyst is provided in the liquid collection tray of the top tray. This catalyst is intended to promote the reaction of the liquid phase reactants collected in the downcomer, along with any additional reactants charged by line 21 and distributor 20, prior to these reactants being passed into the reaction vessel 12. In this embodiment the catalyst bed 27 rests upon the bottom of the downcomer and no catalyst retention screen is provided.

FIG. 3 presents a more detailed sectional view taken horizontally from the side of a column and illustrating portions of the outer wall 6 of the column, decking material 2 and a single liquid collection downcomer 1. This liquid collection downcomer illustrates further possible mechanical variations. This view is taken looking directly at the imperforate downcomer sidewall 5 and shows that the majority of the downcomer is located below the plane defined by the perforated decking material 2. A porous particle retention screen 24 extends between the sidewalls to seal off the inlet of the downcomer in a manner which prevents the escape of catalyst particles from the downcomer. A further detail shown only in this figure is the provision of alternative liquid outlet filters 23 and 23' to prevent the passage of catalyst particles out of the downcomer with the liquid withdrawn in the drain line 8. In practice only one such porous filter screen would be used, but it could be placed at a number of points exemplified by these two screens. Also shown are the alternative solids withdrawal lines 22 and 22' communicating with the internal volume of the downcomer through the bottom seal plate to aid in the withdrawal of catalyst particles. This view illustrates the use of a sloped bottom plate 28 to direct liquid to the withdrawal point.

It will be realized that the basic components of the apparatus are subject to variation from what is shown in the figures. As already described, the downcomer outlet filter may be located in different orientations. It may extend along the bottom of the downcomer just above the imperforate seal plate to provide a larger surface area and more uniform withdrawal pattern. Likewise the structure of the solids withdrawal line 22 can be varied. It can be extended along the bottom or side of the downcomer to allow communication at a number of points within the downcomer. It is also possible that the bottom of the downcomer can be curved or slanted to one side to aid in the collection of catalyst particles. The screen 24 can also be varied as by attachment to the upper edge of the downcomer side and end walls Further the feed distributor 20 could be located above the screen 24, although its location below the screen facilitates its use in charging new or regenerated catalyst to the downcomer.

While it is necessary to provide screens to prevent the downward passage of catalyst from the liquid collection device, it is not believed necessary to provide a screen above the catalyst bed. The desirability of this screen will be ultimately set by the tendency of the catalyst particles to become suspended in the reactants. Preliminary testing has shown the tested catalysts tended to remain in the liquid collection devices without the use of a retention screen. The catalyst tends to aid in the disengagement of vapor bubbles from the liquid in the downcomer.

FIG. 4 shows alternative structural variations in a liquid collection downcomer used for catalytic distillation. In this embodiment the liquid in the column 6 is collected in the downcomer and admixed with one or more reactants added through inlet line 21 via openings 29. A particle retaining screen 24 is provided as insurance against particles from the catalyst bed 27 exiting from the top of the downcomer. The collected liquid, residual reactants and reaction products exit the bottom of the downcomer through a number of openings 3 in the bottom of the downcomer seal plate 28. The openings are larger than the perforations 30 in the tray deck and are grouped together at locations which result in the emerging liquid falling onto selected points of the tray deck of the next lower tray. The openings are covered by screens, not shown, to retain the catalyst particles.

While the downcomers shown in the drawing are horizontally spaced apart at substantially uniform distances across the width of the tray, it is contemplated that the spacing could be skewed to place adjacent conventional downcomers closer than normal to the liquid collection downcomer used to withdraw liquid from the column to thereby provide a more uniform distribution of liquid to the tray below.

One embodiment of the invention may be accordingly characterized as an apparatus for use in a catalytic distillation column comprising a cylindrical outer vessel enclosed by a cylindrical sidewall and having an enclosed upper first end and an enclosed lower second end; said apparatus comprising at least one fractionation tray located intermediate said first and second ends and comprising a plurality of planar perforated vapor liquid contacting decks; a plurality of elongated trough shaped downcomers located between said contacting decks, with the downcomers having substantially imperforated end walls and side walls which adjoin a lower seal plate having liquid sealable outlet means; at least one elongated trough shaped liquid collection device located between two of said contacting decks and comprising substantially imperforate end walls and sidewalls and a lower seal plate, with a first edge of the sidewalls and endwalls forming a rectangular liquid inlet and with parallel second edges of the endwalls and side walls being attached to the lower seal plate; a liquid outlet conduit extending through the sidewall of the vessel from the interior of said liquid collection device to a point located outside the vessel; a solids withdrawal conduit extending through the sidewall of the vessel from the interior of said liquid collection device to a point outside the vessel; and, a foraminous particle retention means extending across the inlet of the liquid collection device forming a particle retention volume substantially enclosed by said sidewalls, end walls, seal plate and particle retention means bordered.

The subject apparatus allows the periodic replacement of catalyst or adsorbent particles retained in individual downcomers as the need arises. This replacement could be to counteract the presence of a catalyst poison in the reactants or a natural deactivation phenomenon such as the accumulation of polymeric carbonaceous deposits in the pores of the catalyst or adsorbent. As the catalyst is located in several downcomers, the removal of catalyst from any single downcomer will not greatly change the operation of the overall column. Thus catalyst can be periodically removed for regeneration without a significant disturbance to the operation of the related process.

Catalyst, or other particles, to be added to the downcomer are preferably added as a dilute slurry in one or more of the reactants present in the catalytic distillation column. The liquid used to feed fresh particles, or to fluidize used particles for their removal, can in fact be liquid simultaneously withdrawn from one or more other liquid collection downcomers. These liquid streams can be withdrawn from the downcomer being recharged through the downcomer liquid drainline 8 or allowed to overflow out of the top of the downcomer through the particle-retaining screen 24.

A further embodiment of the invention therefore is a catalytic distillation process wherein catalyst particles are periodically replaced in the subject downcomers using the methods taught herein.

What is claimed:

1. An apparatus for use in a vapor-liquid contacting process comprising:
   a. a cylindrical outer vessel enclosed by a cylindrical sidewall and having an enclosed upper first end and an enclosed lower second end;
   b. vapor-liquid contacting means arrayed between the first and second ends of the vessel; and,
   c. at least one fractionation tray located intermediate said first and second ends and comprising:
      i. a plurality of planar perforated vapor liquid contacting decks;
      ii. a plurality of elongated trough shaped downcomers located between said contacting decks with the downcomers having substantially imperforate end walls and side walls which adjoin a lower seal plate having liquid sealable outlet means;
      iii. at least one elongated trough shaped liquid collection device located between two of said contacting decks and comprising substantially imperforate end walls, sidewalls and lower seal plate; and,
      iv. a liquid outlet conduit extending through the sidewall of the vessel from the interior of said liquid collection device to a point located outside the vessel.

2. An apparatus for use in a catalytic distillation column comprising a cylindrical outer vessel enclosed by a cylindrical sidewall and having an enclosed upper first end and an enclosed lower second end; said apparatus comprising:
   a. at least one fractionation tray located intermediate said first and second ends and comprising:
      i. a plurality of planar perforated vapor liquid contacting decks;
      ii. a plurality of elongated trough shaped downcomers located between said contacting decks, with the downcomers having substantially imperforate end walls and side walls which adjoin a lower seal plate having liquid sealable outlet means;
      iii. at least one elongated trough shaped liquid collection device located between two of said contacting decks and comprising substantially imperforate end walls and sidewalls and a lower seal plate, with a first edge of the sidewalls and endwalls forming a rectangular liquid inlet and with parallel second edges of the endwalls and side walls being attached to the lower seal plate;
      iv. a liquid outlet conduit extending through the sidewall of the vessel from the interior of said liquid collection device to a point located outside the vessel;
      v. a solids withdrawal conduit extending through the sidewall of the vessel from the interior of said liquid collection device to a point outside the vessel; and,
      vi. a foraminous particle retention means extending across the inlet of the liquid collection device forming a particle retention volume substantially enclosed by said sidewalls, end walls, seal plate and particle retention means.

3. The apparatus of claim 2 further comprising a bed of solid particulate material located within the liquid collection device.

4. The apparatus of claim 3 further characterized in that the solid particulate material in the liquid collection device comprises a catalyst.

5. The apparatus of claim 2 further comprising a particulate feed inlet conduit extending through the wall of the vessel to a point within the liquid collection device.

6. The apparatus of claim 2 further characterized in that the liquid collection device seal plate is perforated.

7. The apparatus of claim 2 further characterized in that the liquid outlet conduit is connected to a reaction zone located outside the outer vessel.

8. The apparatus of claim 2 further characterized in that the liquid outlet conduit is in communication with a trough-shaped liquid distribution device located on a different fractionation tray located within the outer vessel.

9. The apparatus of claim 4 further comprising a reactant inlet conduit extending through the sidewall of the outer vessel into the liquid collection device and terminating with a liquid distribution means located above the solid particulate material.

10. An apparatus for use in a catalytic distillation process comprising:
 a. a cylindrical outer vessel enclosed by a cylindrical sidewall and having an enclosed upper first end and an enclosed lower second end;
 b. vapor liquid contacting means arrayed between the first and second ends of the vessel; and,
 c. at least one fractionation tray located intermediate said first and second ends and comprising:
  i. a plurality of planar perforated vapor liquid contacting decks;
  ii. a plurality of elongated trough shaped downcomers located between said contacting decks, with the downcomers having substantially imperforate end walls and side walls which adjoin a lower seal plate having liquid sealable outlet means;
  iii. at least one elongated trough shaped liquid collection device located between two of said contacting decks and comprising substantially imperforate end walls, sidewalls and a perforated lower seal plate;
  iv. a bed of particulate catalyst retained within the liquid collection device; and,
  v. a liquid inlet conduit extending through the sidewall of the vessel into the interior of said liquid collection device from a point located outside the vessel.

* * * * *